United States Patent
Mochizuki (10) Patent No.: US 8,480,270 B2
(45) Date of Patent: Jul. 9, 2013

(54) HEADLAMP AIMING SYSTEM

(75) Inventor: Kiyotaka Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 149 days.

(21) Appl. No.: 12/996,006

(22) PCT Filed: May 27, 2009

(86) PCT No.: PCT/JP2009/002332
§ 371 (c)(1),
(2), (4) Date: Dec. 2, 2010

(87) PCT Pub. No.: WO2009/147799
PCT Pub. Date: Dec. 10, 2009

(65) Prior Publication Data
US 2011/0080751 A1    Apr. 7, 2011

(30) Foreign Application Priority Data
Jun. 4, 2008  (JP) .................. 2008-147054

(51) Int. Cl.
*B60Q 1/08* (2006.01)
(52) U.S. Cl.
USPC ........... 362/465; 362/466; 362/467; 362/539; 362/419
(58) Field of Classification Search
USPC ................. 362/460, 464, 465, 466, 523, 524, 362/525, 538, 539, 287, 427, 419, 420, 421, 362/422, 423, 424, 425, 428, 467; 356/121; 307/49
See application file for complete search history.

(56) References Cited

U.S. PATENT DOCUMENTS

| 5,619,322 | A * | 4/1997 | Murata et al. ................. 356/121 |
| 6,990,397 | B2 * | 1/2006 | Albou et al. .................... 701/49 |
| 2004/0178738 | A1 * | 9/2004 | Brun et al. ...................... 315/82 |
| 2006/0239019 | A1 * | 10/2006 | Kiyota .......................... 362/466 |
| 2008/0112179 | A1 * | 5/2008 | Tatara et al. .................. 362/515 |

FOREIGN PATENT DOCUMENTS

| JP | 04-025741 | 1/1992 |
| JP | 04-142439 | 5/1992 |
| JP | 06-162804 | 6/1994 |
| JP | 06-273274 | 9/1994 |

(Continued)

OTHER PUBLICATIONS

Translated document, Written Opinion of the International Searching Authority, translation undated, 3 pages.
Translated document, International Preliminary Report on Patentability, dated Sep. 29, 2010, 6 pages.
Translated document, International Search Report, dated Jun. 23, 2009, 2 pages.

(Continued)

Primary Examiner — Thomas Sember
(74) Attorney, Agent, or Firm — Fulwider Patton LLP (57) ABSTRACT

A headlamp aiming system is configured to include: a lamp unit; an actuator configured to displace the light axis of the lamp unit; an imaging apparatus configured to acquire the information necessary for adjustment of the light axis; and an ECU configured to control the actuator. By imaging a light distribution pattern formed by lighting the lamp unit with the imaging apparatus, and by controlling the actuator by the ECU such that the deviation between the position of an attention point in a light distribution pattern, obtained from the imaged image information, and the position of a reference point that has been set beforehand becomes the minimum or zero, an attitude of the lamp unit is adjusted such that aiming of the lamp unit can be automatically performed in a self-contained manner.

8 Claims, 6 Drawing Sheets

FOREIGN PATENT DOCUMENTS

| | | |
|---|---|---|
| JP | 07-098225 | 4/1995 |
| JP | 2004-189220 | 7/2004 |
| JP | 2007-293688 | 11/2007 |
| JP | 2008-105518 | 5/2008 |
| JP | 2008-123854 | 5/2008 |

OTHER PUBLICATIONS

JPO, Office Action in counterpart application JP 2010-515749 dated May 7, 2013.

* cited by examiner

HEADLAMP AIMING SYSTEM

CROSS-REFERENCES TO RELATED APPLICATIONS

This is a U.S. national phase of PCT/JP2009/002332, filed 27 May 2009, claiming priority from Japanese Application No. JP2008-147054, filed 4 Jun. 2008.

FIELD OF THE INVENTION

The present invention relates to a headlamp aiming system, and in particular, to a headlamp aiming system in which aiming of a headlamp apparatus is automatically performed.

BACKGROUND ART

In an automotive headlamp apparatus, aiming adjustment for adjusting the direction of the light axis is generally performed when the automotive headlamp apparatus is installed in a vehicle body or the vehicle is inspected. If this aiming adjustment is performed when, for example, an automotive headlamp apparatus is installed in a vehicle body, a vehicle in which the headlamp apparatus is installed is placed face to face with the front of an aiming inspection apparatus arranged on the production line. Then, the vehicle is fixed to a prescribed position on the production line by, for example, compressing four wheels with a compression apparatus, and the light of the headlamp apparatus is emitted on an inspection screen of the aiming inspection apparatus in the state. An installation attitude of the headlamp apparatus is adjusted such that a feature portion in the light distribution pattern formed on the inspection screen by lighting the headlamp apparatus, for example, an elbow point of a cut-off line, is matched to the reference point formed on the inspection screen beforehand, the reference point corresponding to the type of the vehicle. Adjustment of the installation attitude is performed by, for example, an inspection worker swinging the bracket of a lamp unit, arranged inside the headlamp apparatus, in the vehicle horizontal direction or vertical direction (forward leaning/backward leaning direction). For example, when one of the left-and-right pair of adjustment screws, provided in the bracket of the lamp unit, is moved in the vehicle longitudinal direction, the lamp unit can be swung in the vehicle horizontal direction. When each of the pair of the adjustment screws is moved by the same distance as each other in the vehicle longitudinal direction, the lamp unit can be swung in the vehicle vertical direction (forward leaning/back leaning direction).

When aiming adjustment is performed such that the installation attitude is oriented upward from its optimal point, there are sometimes the cases where dazzle accompanying discomfort, so-called glare, may be provided to an oncoming vehicle or a pedestrian. Conversely, when aiming adjustment is performed such that the installation attitude is oriented downward from its optimal point, there are sometimes the cases where the illumination area to a driver is deteriorated. Accordingly, in order to improve the accuracy of an aiming inspection by an inspection worker and the efficiency of the work, various inspection apparatuses have been proposed as disclosed, for example, in Patent Documents 1 to 3.

[Patent Document 1] Japanese Patent Application Publication No. H4-142439
[Patent Document 2] Japanese Patent Application Publication No. H4-25741
[Patent Document 3] Japanese Patent Application Publication H6-273274

DISCLOSURE OF THE INVENTION

Problem to be Solved by the Invention

However, the final adjustment work in conventional aiming inspections has been performed as follows: an inspection worker visually compares, on an inspection screen, the position of an elbow point with that of the reference point, and then the worker adjusts adjustment screws provided in a lamp unit, recognizing the difference between the two points. As a result, there has been the problem that a variation occurs in aiming adjustment results due to a variation in the levels of adjustment skill of every inspection worker or a difference among daily adjustment feelings.

Therefore, the present invention has been made in order to solve the aforementioned problem, and a purpose of the invention is to provide a headlamp aiming system in which aiming of a headlamp apparatus can be automatically performed without involving adjustment work by an inspection worker.

Means for Solving the Problem

In order to solve the aforementioned problem, a headlamp aiming system according to an embodiment of the present invention comprises: a lamp unit configured to emit light in front of a vehicle; a light axis displacement unit configured to displace the light axis of the lamp unit in at least one of the vehicle vertical direction and the vehicle horizontal direction; an information acquisition unit configured to acquire information indicating a deviation between an attention area in a light distribution pattern emitted by the lamp unit and a reference area in front of the vehicle that is to be matched to the attention area; and a displacement control unit configured to displace the light axis of the lamp unit by driving the light axis displacement unit such that the attention area is matched to the reference area using the deviation acquired by the information acquisition unit.

The lamp unit emits light onto a screen set at a predetermined position in front of the vehicle. The information acquisition unit acquires the information indicating the deviation between the attention area in the light distribution pattern emitted by the lamp unit and the reference area in front of the vehicle that is to be matched to the attention area. In this case, the information acquisition unit may be one that is built in, for example, the headlamp apparatus to directly acquire the information indicating the deviation. Alternatively, the information acquisition unit may be one that acquires only the information indicating the deviation determined by an apparatus mounted on the vehicle. In this case, the apparatus mounted on the vehicle side may be one that acquires only the information indicating a deviation to be used in the present system, or one that acquires information to be used in another system in addition to the information to be used in the present system. The displacement control unit performs aiming adjustment by displacing the light axis of the lamp unit with the drive of the light axis displacement unit such that the attention area is matched to the reference area using the deviation acquired by the information acquisition unit.

According to the embodiment, the light axis displacement unit automatically adjusts the light axis of the lamp unit based on the information indicating the deviation acquired by the information acquisition unit such that the attention area is matched to the reference area, and hence it becomes possible to perform aiming of the headlamp apparatus without dependence on the adjustment capability or an adjustment feeling of an inspection worker. As a result, an artificial variation in the adjustment can be excluded, thereby allowing for high accuracy of aiming adjustment and stabilization of an adjustment state to be achieved.

Also, in the aforementioned embodiment, the attention area may be an attention point defined on a cut-off line of the light distribution pattern, and the reference area may be a reference point projected in front of a vehicle that is to be matched to the attention point. Because the cut-off line is the boundary between light and dark in a light distribution pattern, the attention point can be easily recognized by setting the attention point on the cut-off line, thereby allowing for the attention point to be easily matched to the reference point projected in front of the vehicle. As a result, aiming adjustment can be performed quickly and accurately.

Also, in the aforementioned embodiment, the cut-off line on which the attention point is defined may be formed in a light distribution pattern for aiming that is a light distribution pattern, at least part of which is subjected to emphasis processing. The cut-off line on which the attention point is defined may or may not have the same shape as the cut-off line used during actual driving of a vehicle. If the shape is the same, the edge of the cut-off line may be made clear by adjusting the position of a shade forming the cut-off line. If the shape is made different, a shade used only for aiming may be used. In this case, a right angle-shaped portion or acute angle-shaped portion may be formed in the dedicated shade to easily detect an attention point, or a vertical line portion to be parallel with the vertical line including the reference point may be formed. According to the embodiment, an attention point can be easily recognized and easily matched to the reference point. As a result, aiming adjustment can be performed quickly and with high accuracy.

Also, in the aforementioned embodiment, the attention area may be an area with the maximum luminance in the luminance distribution of an image obtained by imaging the light distribution pattern, and the reference area may be a matching area that is projected in front of the vehicle and is to be matched to the area with the maximum luminance. For example, the luminance distribution can be obtained from an image that has been obtained by imaging the distribution pattern with an imaging apparatus. When a lamp unit has a single light source, the luminance distribution thereof has its maximum at the position of the light source, that is, at the position corresponding to the position of the light axis. By making the area with the maximum luminance be an attention area, the attention area can be easily matched to the reference area even when it is difficult to detect the attention area due to, for example, the shape of the cut-off line, or even in the case of a headlamp apparatus configured to emit a light distribution pattern for high beam in which a cut-off line is not formed. As a result, aiming adjustment can be performed quickly and accurately.

Also, in the aforementioned embodiment, the light axis displacement unit may be provided with: a pivot shaft configured to pivotally support the lamp unit such that the light axis thereof is displaced in the vehicle horizontal direction; and a shaft tilting mechanism configured to tilt the pivot shaft in the vehicle longitudinal direction such that the light axis thereof is displaced in the vehicle vertical direction. According to this embodiment, the light axis can be displaced in the vehicle horizontal direction by rotating the pivot shaft supporting the lamp unit. Also, the light axis can be displaced downwards by tilting the pivot shaft in front of the vehicle. Similarly, the light axis can be displaced upwards by tilting the pivot shaft in back of the vehicle. In this case, because an actually-driven shaft can be single, a driving error can be reduced to the minimum. As a result, an error in aiming adjustment can be greatly reduced.

Also, in the aforementioned embodiment, the headlamp aiming system may be configured to include an imaging apparatus arranged close to the light axis of the lamp unit. By arranging the imaging apparatus close to the light axis of the lamp unit, the angle between the light axis of the lamp unit and the imaging center axis of the imaging apparatus can be made small. As a result, it can be reduced that an error due to an imaging angle may be included in the information indicating the deviation between the attention area and the reference area. As a result, processing for calculating a deviation can be simplified and the reliability of the information indicating a deviation can be improved, thereby allowing for high accuracy of aiming adjustment to be easily achieved.

Advantage of the Invention

According to the headlamp aiming system of the present invention, aiming of a headlamp can be automatically performed without involving adjustment work by an inspection worker, thereby allowing for high accuracy of aiming adjustment and stabilization of an adjustment state to be achieved.

REFERENCE NUMERALS

10 AUTOMOTIVE HEADLAMP APPARATUS
12 LAMP BODY
14 TRANSPARENT COVER
16 LAMP CHAMBER
18 LAMP UNIT
20 ACTUATOR
22 BULB
24 REFLECTOR
26 ROTATABLE SHADE
28 PROJECTION LENS
72 IMAGING APPARATUS
74 ECU

110 LIGHT DISTRIBUTION PATTERN FOR LOW BEAM
112 CUT-OFF LINE
114 ATTENTION POINT
116 REFERENCE POINT
118 LIGHT DISTRIBUTION PATTERN FOR AIMING
100 HEADLAMP AIMING SYSTEM

BEST MODE FOR CARRYING OUT THE INVENTION

Hereinafter, preferred embodiments of the present invention will be described based on the accompanying drawings.

A headlamp aiming system according to the present embodiment is configured to include: a lamp unit; a light axis displacement unit configured to displace the light axis of the lamp unit; an information acquisition unit configured to acquire the information necessary for adjustment of the light axis; and a displacement control unit configured to control the light axis displacement unit. The displacement control unit in the headlamp aiming system controls an attitude of the lamp unit by controlling the light axis displacement unit using the information acquired by the information acquisition unit. That is, the headlamp aiming system according to the present embodiment automatically performs aiming of the lamp unit in a self-contained manner using the configuration in the vehicle.

Figure 1:
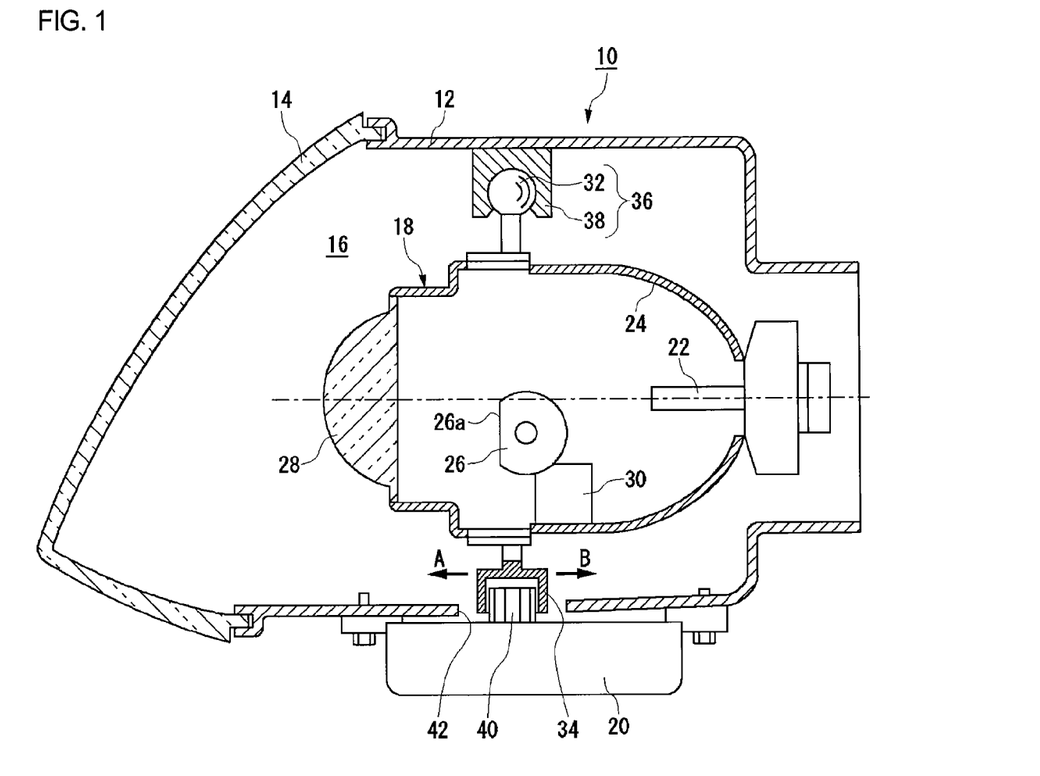
FIG. 1 is a view illustrating the schematic configuration of an automotive headlamp apparatus applicable to a headlamp aiming system according to the present embodiment.

FIG. 1 is a view illustrating the schematic configuration of an automotive headlamp apparatus 10 applicable to a headlamp aiming system according to the present embodiment.

The automotive headlamp apparatus 10 illustrated in FIG. 1 is a two-lamp automotive headlamp apparatus, which is referred to as a so-called headlamp of a light distribution variable type. The automotive headlamp apparatus 10 has a lamp chamber 16 formed by both a lamp body 12 having an opening in the vehicle forward direction and a transparent cover 14 covering the opening of the lamp body 12. In the lamp chamber 16, a lamp unit 18 emitting light in the vehicle forward direction is housed in a manner in which the lamp unit 18 can be swung in the vehicle vertical direction and horizontal direction. Under the lower surface of the lamp body 12, an actuator 20 functioning as a light axis displacement unit for swinging the lamp unit 18 in the vehicle vertical direction and horizontal direction.

The lamp unit 18 is configured to include a bulb 22, a reflector 24, a rotatable shade 26, and a projection lens 28. The rotatable shade 26, functioning as a light-shielding member, has a cylinder shape with a notch portion 26a formed by part of the outer shape of the rotatable shade 26 being cut off in the axial direction. The rotatable shade 26 is rotationally driven by a drive mechanism, such as a motor 30. The rotatable shade 26 shields part of the light of the bulb 22 reflected by the reflector 24 in accordance with its rotational state, and emits the light in front of the vehicle through the projection lens 28. As a result, a light distribution pattern for low beam in line with the ridge line shape of the rotatable shade 26, located on the light axis, is formed. Also, by rotating the rotatable shade 26 such that the notch portion 26a is located on the light axis, the light from the bulb 22 reflected by the reflector 24 is emitted in front of the vehicle through the projection lens 28 without being shielded by the rotatable shade 26. As a result, a light distribution pattern for high beam is formed. On the outer circumferential surface of the rotatable shade 26 other than the notch portion 26a, multiple types of ridge line shapes can be formed. For example, a light distribution pattern for low beam having shape characteristics at both end portions, or that having a shape characteristic at the central portion, may be formed other than the light distribution pattern for low beam used in usual driving.

Although descriptions will be made later, when performing aiming adjustment in the present embodiment by using a light distribution pattern for aiming, a ridge line portion for aiming, with which a light distribution pattern for aiming is formed, may be provided in part of the outer shape of the rotatable shade 26. Alternatively, a plate-shaped shade may be used instead of the rotatable shade 26.

A body connection portion 32 for connecting with the inner wall surface of the lamp body 12 is formed in the upper end portion of the lamp unit 18. An actuator connection portion 34 for connecting with the actuator 20 is formed in the lower end portion of the lamp unit 18.

The body connection portion 32 can be made to be a spherical body of which part of, for example, a ball joint 36, a type of universal joints, is composed. A lamp unit connection portion 38 of which part of the ball joint 36 is composed is formed on the inner wall surface of the lamp body 12. Accordingly, the lamp unit 18 is supported by the ball joint 36 in a manner in which the lamp body 12 is hung from the inner wall surface of the lamp body 12. As a result, the light axis of the lamp unit 18 can be oriented in any direction of the vehicle horizontal direction and vertical direction.

The actuator connection portion 34 is a tubular member, the section of which is concave shaped, and a plurality of spline grooves oriented in the axial direction are formed on the inner wall surface thereof, the spline grooves being geared with corresponding splines formed in an output shaft 40 of the actuator 20. A rotation drive source for rotating the output shaft 40 and a parallel drive source for displacing the output shaft 40 in the vehicle longitudinal direction (Arrow A-B direction), which will be described later, are housed in the actuator 20. As a result, when the output shaft 40 is rotated, the lamp unit 18 can be swung in the vehicle left direction or the right direction with the ball joint 36 being a rotational axis, so that the light axis of the lamp unit 18 is oriented in the corresponding direction. Further, when the output shaft 40 is displaced in the vehicle forward direction (Arrow A direction), the lamp unit 18 can be leaned backwards with the ball joint 36 being a fulcrum point, so that the light axis of the lamp unit 18 is oriented in the vehicle upward direction. Similarly, when the output shaft 40 is displaced in the vehicle backward direction (Arrow B direction), the lamp unit 18 can be leaned forwards with the ball joint 36 being a fulcrum point, so that the light axis of the lamp unit 18 is oriented in the vehicle downward direction. As long as the lamp unit 18 can be moved in the vehicle horizontal direction and vertical direction (forward leaning/backward leaning direction), other connection structures, for example, a plate spring structure and a coil spring structure, may be used instead of the ball joint 36.

The actuator 20 is arranged on the lower surface of the lamp body 12. The output shaft 40 is connected with the actuator connection portion 34 through an insertion hole 42 formed on part of the lower surface of the lamp body 12. Because the output shaft 40 is moved in the vehicle longitudinal direction as well as being rotated, as stated above, the insertion hole 42 can be made to have a long hole shape extending, for example, in the vehicle longitudinal direction.

According to the automotive headlamp apparatus 10 thus configured, a driver can adjust the light axis of the lamp unit 18 in an arbitrary direction with a manual operation. Alternatively, the light axis of the lamp unit 18 can be automatically adjusted in the up/down direction (forward leaning/backward leaning direction) based on the information from a sensor detecting a nosedive or nose-up of the vehicle, a vehicle height sensor, or an acceleration/deceleration sensor, etc. Similarly, the light axis of the lamp unit 18 can be swiveled in the vehicle horizontal direction based on the information from a steering angle sensor or a lateral acceleration sensor, etc.

In FIG. 1, illustration of control units of the actuator 20, bulb 22, and motor 30, and wiring parts thereof are omitted.

Figure 2:
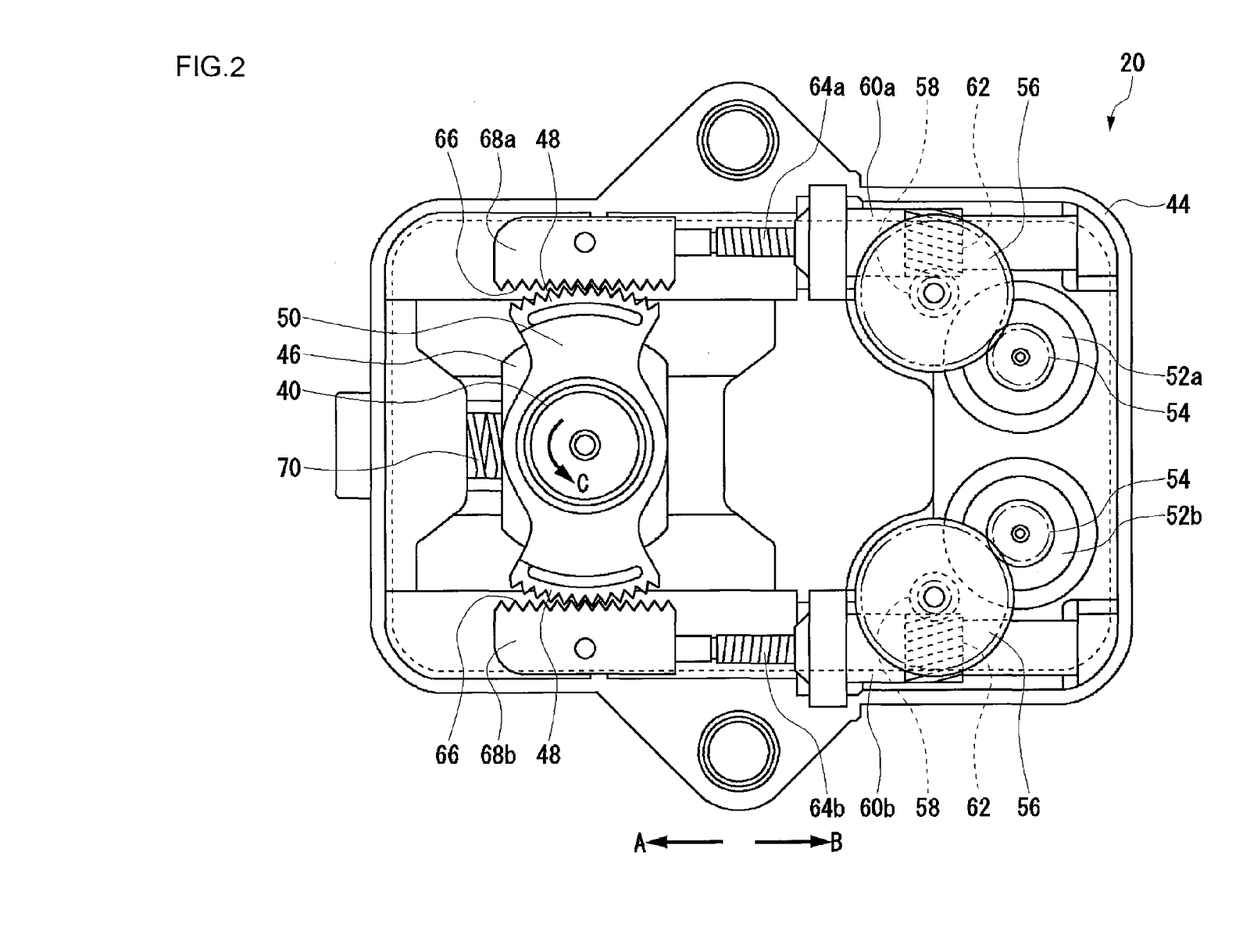
FIG. 2 is a view illustrating the internal structure of an actuator in the automotive headlamp apparatus applicable to the headlamp aiming system according to the embodiment.

FIG. 2 is a view illustrating the internal structure of the actuator 20.

A slider 46 is supported so as to be movable in Arrow A-B direction, the vehicle longitudinal direction, in a case 44 of the actuator 20. The slider 46 pivotally supports a gear plate 50, both ends of which a pair of sector gears 48 are provided at and the approximate center of which the output shaft 40 is pivotally embedded at.

Motors 52*a* and 52*b*, rotational amounts and rotational directions of which are controlled by an ECU 74, which will be described later, are arranged in the case 44. A drive gear 54, geared with a transmission gear 56, is fixed to each of the output shafts of the motors 52*a* and 52*b*. A worm gear 58 is arranged concentrically with the transmission gear 56. A pair of cylindrical gears 60*a* and 60*b* are provided, in an extended manner in the vehicle longitudinal direction, in the case 44 so as to be rotatable. A helical gear 62, geared with the worm gear 58 rotating with the transmission gear 56, is formed on part of the outer circumferential surface of each of the cylindrical gears 60*a* and 60*b*. Screw grooves, geared with each of screw shafts 64*a* and 64*b* housed in the cylindrical gears 60*a* and 60*b*, are formed on the inner wall of each of the cylindrical gears 60*a* and 60*b*. Accordingly, feed mechanisms are respectively configured by the cylindrical gear 60*a* and the screw shaft 64*a* and by the cylindrical gear 60*b* and the screw shaft 64*b*.

A rack member 68*a*, having a rack gear 66 geared with the sector gear 48, is connected with the tip of the screw shaft 64*a*. Similarly, a rack member 68*b*, having the rack gear 66 geared with the sector gear 48, is connected with the tip of the screw shaft 64*b*.

Accordingly, when the motor 52*a* is rotationally driven to rotate the cylindrical gear 60*a*, the screw shaft 64*a* will be moved in the direction determined by the rotational direction of the cylindrical gear 60. Similarly, when the motor 52*b* is rotationally driven to rotate the cylindrical gear 60*b*, the screw shaft 64*b* will be moved in the direction determined by the rotational direction of the cylindrical gear 60*b*. For example, when the motors 52*a* and 52*b* are rotationally driven such that the screw shafts 64*a* and 64*b* will be moved in opposite directions to each other, the rack members 68*a* and 68*b* are moved by the same distance in opposite directions to each other, thereby rotating the gear plate 50. For example, when the rack member 68*a* is moved in Arrow A direction and the rack member 68*b* is moved in Arrow B direction, the gear plate 50, i.e., the output shaft 40 is rotated in Arrow C direction. In this case, the actuator 20 functions as a rotation drive source. On the other hand, the motors 52*a* and 52*b* are rotationally driven such that the screw shafts 64*a* and 64*b* are moved by the same distance in the same directions to each other, the rack members 68*a* and 68*b* will be moved by the same distance in the same direction. In this case, the gear plate 50 is not rotated and the slider 46 and the gear plate 50 are integrally moved in the same direction as the direction in which the rack members 68*a* and 68*b* are moved. That is, the output shaft 40 is moved in the vehicle forward direction or backward direction, thereby tilting the lamp unit 18. Accordingly, the actuator 20 functions as a parallel drive source. The slider 46 is always pressurized to be biased in Arrow B direction by a biasing member, such as, for example, a coil spring 70, etc., so that a displacement in the vehicle longitudinal direction (Arrow A-B direction) is stabilized.

By using such an actuator 20 stated above, the lamp unit 18 can be swung in the vehicle vertical direction (forward leaning/backward leaning direction) or horizontal direction with the single output shaft 40. In such a way, a driving error can be reduced to the minimum by making an actually-driven shaft single, thereby allowing for an error in the later-described aiming adjustment to be greatly reduced.

Figure 3:
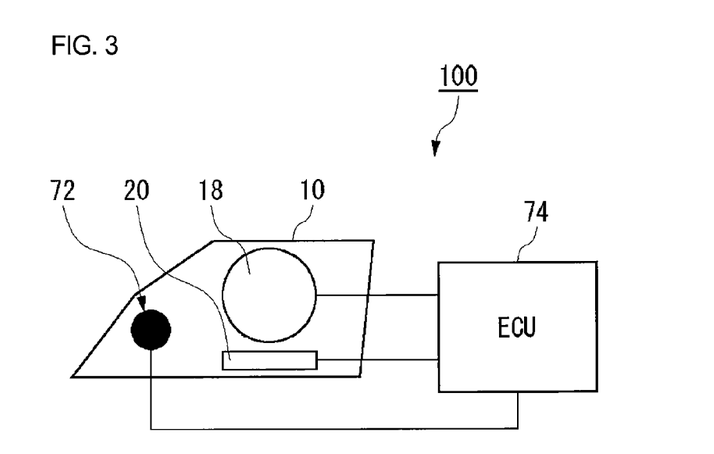
FIG. 3 is a view illustrating the minimum configuration for achieving the headlamp aiming system according to the embodiment.

FIG. 3 is a view illustrating the minimum configuration for achieving the headlamp aiming system according to the present embodiment A headlamp aiming system 100 according to the present embodiment is configured to comprise: a lamp unit 18; an actuator 20 functioning as a light axis displacement unit; an imaging apparatus 72 functioning as part of an information acquisition unit acquiring the information necessary for adjusting the light axis; and an electronic control unit (hereinafter, referred to as an "ECU") 74 functioning as a displacement control unit for controlling the actuator 20 using the acquired information. The ECU 74 may be one that performs both control of lighting the lamp unit 18 and control of imaging with the imaging apparatus 72. It is desirable that the imaging apparatus 72 is arranged close to the lamp unit 18, i.e., close to the light axis thereof. By arranging the imaging apparatus 72 close to the light axis of the lamp unit 18, the angle between the light axis of the lamp unit 18 and the imaging center axis of the imaging apparatus 72 can be made small. As a result, it can be reduced that an error due to the imaging angle may be included in the information indicating the deviation between the attention area and the reference area, which will de described later. As a result, the process for calculating the deviation can be simplified and the reliability of the information indicating the deviation can be improved, thereby allowing for high accuracy of aiming adjustment to be easily achieved.

Figure 4:
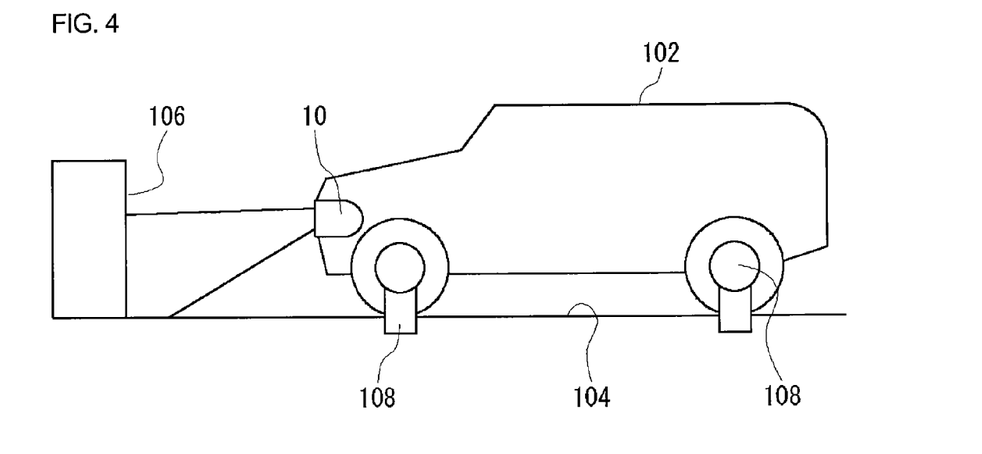
FIG. 4 is a view illustrating a situation of aiming adjustment in a vehicle on which a headlamp aiming system is mounted.

FIG. 4 is a view illustrating a situation of aiming adjustment in a vehicle 102 on which the headlamp aiming system 100 is mounted. The aiming adjustment is performed, for example in the adjustment process of a vehicle production line 104. Other than that, aiming adjustment is sometimes performed when a vehicle is inspected or when the automotive headlamp apparatus 10 is replaced, etc. When the vehicle 102 is transferred into the aiming adjustment position on the vehicle production line 104, where an aiming screen 106 is arranged at a predetermined position, the vehicle 102 is fixed at the place whose horizontal and vertical positions are prescribed relative to the aiming screen 106 on the vehicle production line 104. For example, four wheels of the vehicle 102 are pressed by a positioning lock arm 108 coming out from the side of the vehicle production line 104. While the vehicle 102 is being held in this fixed attitude, the automotive headlamp apparatus 10 is lighted toward the aiming screen 106. The relative distance between the aiming screen 106 and the automotive headlamp apparatus 10 is, for example, 3 m.

The imaging apparatus 72 images a light distribution pattern formed on the aiming screen 106, arranged in front of the vehicle, by the light emitted from the lamp unit 18. The image information of the light distribution pattern imaged with the imaging apparatus 72 is provided to the ECU 74. The ECU 74 detects, in the light distribution pattern, a predetermined attention area, or desirably a pin-pointed attention point by performing, for example, luminance distribution analysis or edge extraction process on the provided image information.

Figure 5A:
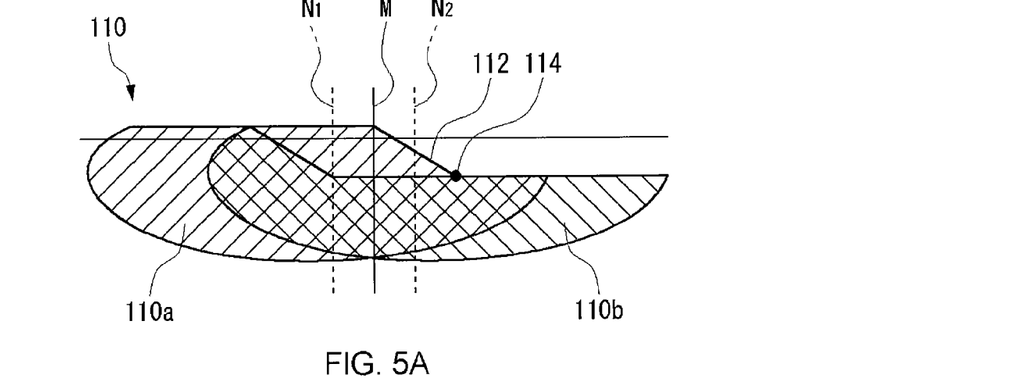
FIGS. 5A and 5B illustrate an example of a light distribution pattern for low beam synthesized by lighting both of the left and right automotive headlamp apparatuses of a vehicle, and that of a light distribution pattern for low beam formed by lighting one of the automotive headlamp apparatuses.

FIG. 5A illustrates an example of a light distribution pattern for low beam synthesized by lighting both of the left and right automotive headlamp apparatuses 10 of the vehicles 102. In the case of FIG. 5A, the aforementioned attention point 114 is set, for example, on the intersection between the horizontal portion and the slope portion of a cut-off line 112 of a light distribution pattern for low-beam 110. The left and right automotive headlamp apparatuses 10 are usually set such that the light axes thereof, i.e., the reference areas, or desirably the pin-pointed reference points thereof are located at the positions horizontally away from the center line M of the vehicle 102 by a predetermined distance in accordance with a type of a vehicle. FIG. 5A shows that the vertical reference line N1 including the reference point of the left automotive headlamp apparatus 10 and that N2 including the reference point of the right automotive headlamp apparatus 10, are located at the positions horizontally away from the center line M by the same distance. As stated above, when performing aiming adjustment using the light distribution pattern for low beam 110 that is used in usual driving, etc., the light distribution pattern 110a by the left automotive headlamp apparatus 10 and the light distribution pattern for low beam 110b by the right automotive headlamp apparatus 10 are partially overlapped each other. As a result, it becomes difficult to distinguish which the attention point 114 belongs to, the light distribution pattern for low beam 110a or that 110b. Accordingly, when performing aiming adjustment by using the light distribution pattern for low beam 110 used in usual driving, etc., the attention point 114 is first extracted by lighting only one of the left and right automotive headlamp apparatuses 10 and then aiming adjustment is performed. Thereafter, aiming adjustment of the other automotive headlamp apparatus 10 will be performed.

Figure 5B:
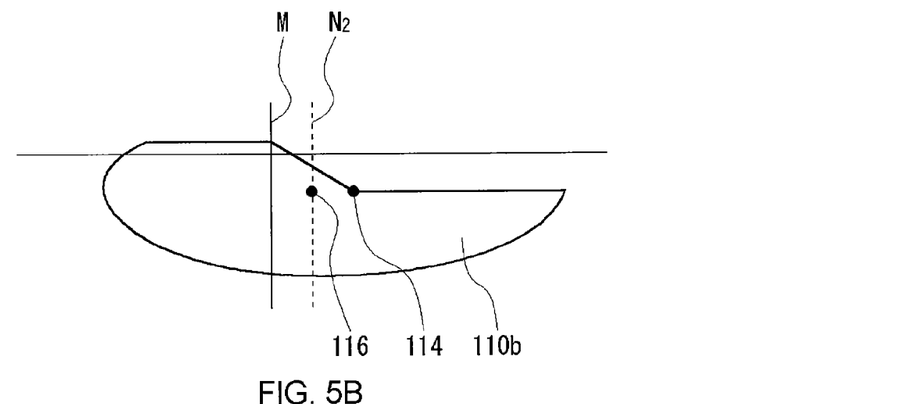

FIG. 5B illustrates the light distribution pattern for low beam 110b obtained when only the left automotive headlamp apparatus 10 is lighted. In this case, the attention point 114, the intersection of the horizontal portion and the slant portion of the light distribution pattern for low beam 110b, can be easily detected. As stated above, for every type of vehicles, it is determined in the design stage what position on the screen, arranged in front of a vehicle, the position of the light axis of the automotive headlamp apparatus 10 should be located at. When the light axis is located higher than the determined reference point, discomfort dazzling, so-called glare, may be provided to an oncoming vehicle or a pedestrian while the automotive headlamp apparatus 10 is being lighted. On the other hand, when the light axis is located lower than that, the illumination range of the automotive headlamp apparatus 10 may be deteriorated while the apparatus 10 is being lighted. The reference point 116 may be separately projected on the aiming screen 106 by using a projection apparatus, or be marked on the aiming screen 106 beforehand as a mark for every type of vehicles and for every automotive headlamp apparatus 10. The reference point 116 formed on the aiming screen 106 is imaged with the imaging apparatus 72, together with the attention point 114, to be provided to the ECU 74. Then, the deviation between the position of the attention point 114 and that of the reference point 116 will be calculated. Accordingly, the imaging apparatus 72 and part of the configurations of the ECU 74 function as the information acquisition unit in this case.

The ECU 74 controls the actuator 20 such that the lamp unit 18 is displaced in the vehicle vertical direction (forward leaning/backward leaning direction) or horizontal direction to make the deviation between the position of the attention point 114 and that of the reference point 116 be the minimum, or desirably make the two position match each other, on the aiming screen 106 or in the work area of the ECU 74. As a result, the position of the light axis of the lamp unit 18 in the automotive headlamp apparatus 10 can be adjusted to an optimal state in which glare or deterioration of the illumination area do not occur. In this case, because the actuator 20 controls the attitude of the lamp unit 18 such that the deviation between the position of the attention point 114 and that of the reference point 116 becomes the minimum or zero, an adjustment error is mechanically stabilized and a variation among vehicles can be substantially excluded. After aiming adjustment of one of the automotive headlamp apparatuses 10 is completed, that of the other will be performed in the same way.

As long as the position of the attention point 114 is easily detected, it can be appropriately changed. For example, the attention point 114 may be located at the upper end of the slope portion of the light distribution pattern for low beam 110, or at the edge of the end portion thereof, etc.

Because the light distribution pattern for low beam 110 used in usual driving has a shape in which prevention of glare and securing of the illumination area are in preference, there are sometimes the cases where it is not easy to specify the attention point 114 in the shape. Further, in some types of the automotive headlamp apparatus 10, the cut-off line of the light distribution pattern for low beam 110 to be formed, a boundary between light and dark, is intentionally obscured. This is done because, if the boundary between light and dark in the light distribution pattern for low beam 110 is made clear, the outside of a light area viewed from the driver, that is, a dark area sometimes looks darker, thereby causing the driver to have a feeling of anxiety. In such a case, if the light distribution pattern for low beam 110 is imaged with the imaging apparatus 72 to perform aiming adjustment, an error may be included in detecting the position of the attention point 114.

Figure 6:
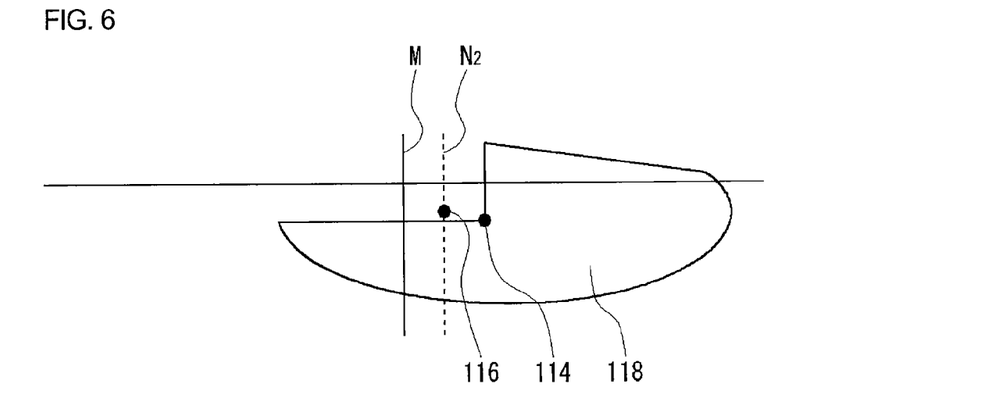
FIG. 6 is a view illustrating the shape of a light distribution pattern for aiming that is only used in aiming adjustment.

Accordingly, in another embodiment of the present invention, a light distribution pattern for aiming 118, only used in aiming adjustment, is used in which emphasizing processing where part of the contour thereof is made to have a right angle, etc., is performed, as illustrated in FIG. 6. The light distribution pattern for aiming 118 can be formed by forming a dedicated ridge line shape on, for example, part of the outer circumferential surface of the rotatable shade 26. A right-angled-shaped portion or acute-angle-shaped portion may be formed in the light distribution pattern for aiming 118 to easily detect the attention point 114, or a vertical line portion parallel with the vertical line including the reference point 116 may be formed therein. Although FIG. 6 illustrates, as an example, a shape similar to the light distribution pattern for low beam used in usual driving, the shape may be appropriately selected, and may include, for example, multiple right-angled portions. In this case, by setting multiple attention points 114, the attention points 114 and the reference points 116 can be matched to each other in multiple places. In this case, the reliability of aiming adjustment can be easily improved. As stated above, by using the light distribution pattern for aiming 118, the attention point 114 can be easily recognized and can be easily matched to the reference point 116. As a result, aiming adjustment can be performed quickly and with high accuracy.

Depending on the shape of the light distribution pattern for aiming 118 and the set position of the attention point 114, the respective attention points 114 of both the left and right light distribution patterns for low beam 110 can be easily extracted even when both the light distribution patterns are overlapped by simultaneously lighting both the left and right automotive headlamp apparatuses 10, thereby allowing for a period of time for aiming adjustment to be shortened. As a technique of intentionally obscuring the cut-off line, it can be achieved by slightly shifting forward or backward the stopped position of the ridge line portion for low beam of the rotatable shade 26 from the original rotational position. Accordingly, by rotating the rotatable shade 26 to the original position where the cut-off line is not obscured, a light distribution pattern in which the attention point 114 can be easily extracted, i.e., the light distribution pattern for aiming 118, may be formed.

In the aforementioned embodiment, an example of the automotive headlamp apparatus 10 of a light distribution variable type has been described in which aiming adjustment is performed by extracting the attention point 114 in the light distribution pattern for low beam 110. In this case, because the lamp unit 18 is commonly used between the low beam and the high beam, aiming adjustment is completed as a whole by determining an attitude of the lamp unit 18 using the light distribution pattern for low beam. On the other hand, when the lamp unit for low beam and that for high beam are completely separate from each other in a four-lamp automotive headlamp apparatus, that is, an automotive headlamp apparatus of a so-called light distribution fixed type, it is necessary to separately perform aiming adjustment of the lamp unit for high beam. Also, when the cut-off line is intentionally obscured and the light distribution pattern for aiming 118 is not included even in the case of the aforementioned automotive headlamp apparatus 10 of a light distribution variable type, it is necessary to perform aiming adjustment by another technique.

Figure 7:
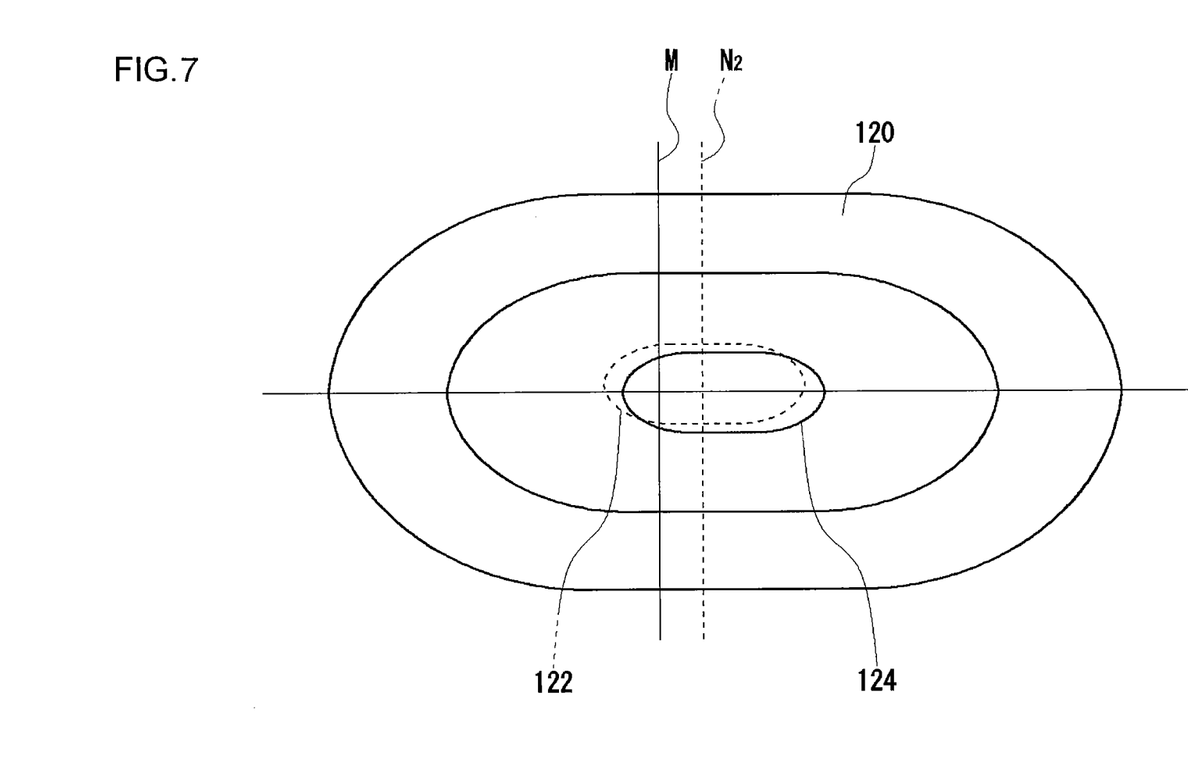
FIG. 7 is a view schematically illustrating a luminance distribution of the image information obtained when a light distribution pattern for high beam is imaged with an imaging apparatus.

FIG. 7 is a view illustrating an example in which aiming adjustment is performed using a light distribution pattern without a cut-off line, i.e., a light distribution pattern for high beam. FIG. 7 schematically illustrates a luminance distribution of the image information obtained when a light distribution pattern for high beam 120 is imaged with the imaging apparatus 72. Because the light from the bulb 22 is not shielded by a shade, etc., in the light distribution pattern for high beam 120, the pattern for high beam 120 has an almost ellipsoidal shape. When the light distribution pattern for high beam 120 is imaged with the imaging apparatus 72, information on a luminance distribution thereof can be obtained. In this case, the luminance becomes highest in the almost center portion thereof, corresponding to the position of the bulb 22. That is, an area with the maximum luminance is located at the same position as the light axis of the lamp unit. Accordingly, it is assumed that an area with the maximum luminance is the position of the light axis of the lamp unit, that is, a reference area 122. Further, it is assumed that an area with the maximum luminance of the luminance distribution, based on the image information obtained by the imaging apparatus 72, is an attention area 124. In the same way as the processing where a light distribution pattern for low beam is used, by lighting only one of both the left and right lamp units for high beam, an attitude of the lamp unit is changed by driving ac actuator such that the deviation between the position of the reference area 122 and that of the attention area 124 becomes the minimum, desirably zero, to perform aiming adjustment. Also, in this case, because an attitude of the lamp unit is adjusted by the actuator such that the deviation between the position of the attention area 124, obtained by the image processing, and that of the reference area 122 becomes the minimum or zero, an error in the adjustment can be mechanically stabilized and therefore a variation among vehicles can be substantially excluded. After aiming adjustment of one of the automotive headlamp apparatuses has been performed, that of the other will be performed in the same way.

Aiming adjustment using a luminance distribution can also be used in an automotive headlamp apparatus of a light distribution variable type, which can provide similar effects.

Figure 8:
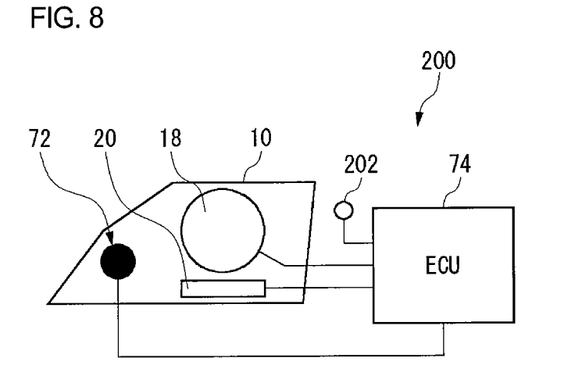
FIG. 8 illustrates a conceptual view of the configuration of a headlamp aiming system according to another embodiment.

FIG. 8 illustrates a conceptual view of the configuration of a headlamp aiming system 200 according to another embodiment. The basic configuration is the same as the headlamp aiming system 100 illustrated in FIG. 3; however, the headlamp aiming system 200 comprises a laser light source 202 for illuminating reference point, in addition to the configuration of the headlamp aiming system 100. The ECU 74 performs controls the laser light source 202 as well as control of the imaging apparatus 72, the actuator 20, and the lamp unit 18.

In the aforementioned embodiments described using FIGS. 1 to 7, aiming adjustment is basically performed in the adjustment process of the vehicle production line 104 or in a dedicated adjustment place of a vehicle inspection station or vehicle maintenance facility. This is done because it is necessary to compare the positions of the attention point 114 and the reference point 116 after the center of a vehicle has been accurately determined relative to the aiming screen 106. In the example of FIG. 8, a configuration is illustrated in which aiming adjustment can be performed in an arbitrary place, desirably on a flat road.

The laser light source 202 is fixed at the position where the positioning thereof can be accurately performed relative to the center of a vehicle, for example, the frame of the vehicle. The light axis of the laser light source 202 is adjusted so as to match the position of the attention point in a light distribution pattern formed on a flat road by the lamp unit 18, the aiming adjustment of which has been performed. That is, the reference position of a vehicle and that of the lamp unit 18 are matched to each other by the laser light source 202 that is accurately associated with the center of the vehicle.

When aiming adjustment of the lamp unit 18 is performed, the reference point is first reflected on a flat road by lighting the laser light source 202. Then, the lamp unit 18 is lighted in the same way as the aforementioned embodiments. Subsequently, the light distribution pattern for low beam 110, formed on the flat road to include the attention point, and the reference point formed by lighting the laser light source 202 are imaged with the imaging apparatus 72. The ECU 74 calculates the deviation between the positions of the reference point and the attention point, which are included in the image information of the light distribution pattern for low beam 110, so that aiming adjustment of the lamp unit 18 is performed by changing an attitude of the lamp unit 18 with the actuator 20 being driven so as to make the deviation be the minimum, or desirably zero.

By providing the reference point used in aiming adjustment from the vehicle side as stated above, it becomes possible to match the light axis of the lamp unit to the reference position of the vehicle. As a result, aiming adjustment can be easily performed on the user side even when the user replaces the automotive headlamp apparatus with another. Further, aiming adjustment can be easily performed in maintenance facilities, etc., without preparing a dedicated adjustment place and an aiming screen. Alternatively, aiming adjustment can be performed by projecting the reference point on the aiming screen 106 by the laser light source 202 in the same way as in FIG. 4.

In the aforementioned embodiments, the actuator 20 has been described as having a structure in which the light axis of the lamp unit 18 can be displaced both in the vehicle vertical direction (forward leaning/backward leaning direction) and in the vehicle horizontal direction. However, in the case of a structure in which the mounting position of the lamp unit 18 in the vehicle vertical direction (forward leaning/backward leaning direction) is uniquely determined by its mechanical configuration, the actuator 20 may be one by which the light axis thereof can be adjusted only in the vehicle horizontal direction. Conversely, in the case of a structure in which the mounting position of the lamp unit 18 in the vehicle horizontal direction is uniquely determined by its mechanical configuration, the actuator 20 may be one by which the light axis thereof can be adjusted only in the vehicle vertical direction (forward leaning/backward leaning direction). Even when the actuator for the vehicle vertical direction (forward leaning/backward leaning direction) and that for the vehicle horizontal direction are separately provided, similar effects as in the present embodiments can be obtained.

The information acquisition unit only has to acquire the information indicating the deviation between the attention area in a light distribution pattern emitted by the lamp unit and the reference area in front of the vehicle that is to be matched to the attention area. The information acquisition unit may be one that is built in, for example, the headlamp apparatus to directly acquire the information indicating the deviation. Alternatively, the information acquisition unit may be one that acquires only the information indicating the deviation detected by an apparatus mounted at any position on the vehicle side. In this case, the apparatus mounted on the vehicle side may be an imaging apparatus that acquires only the information indicating a deviation to be used in the present system, or an imaging apparatus that acquires image information to be used in another system, for example, a leading vehicle recognition system, in addition to the image information to be used in the present system.

The present invention should not be limited to the aforementioned each embodiment, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

INDUSTRIAL APPLICABILITY

The present invention can be used in the field of aiming adjustment of headlamp apparatuses.

The invention claimed is:

1. A headlamp aiming system comprising:
a lamp unit configured to emit light in front of a vehicle;
a light axis displacement unit configured to displace the light axis of the lamp unit in at least one of the vehicle vertical direction and the vehicle horizontal direction;
an information acquisition unit configured to acquire information indicating a deviation between an attention area in a light distribution pattern emitted on an aiming screen by the lamp unit and a reference area in front of the vehicle that is to be matched to the attention area; and
a displacement control unit configured to displace the light axis of the lamp unit by driving the light axis displacement unit such that the attention area is matched to the reference area using the deviation acquired by the information acquisition unit,
wherein the attention area is an attention point defined on a cut-off line of a light distribution pattern for aiming of which part of a contour is made to have a right angle, and the reference area is a reference point projected in front of a vehicle that is to be matched to the attention point.

2. The headlamp aiming system according to claim 1, wherein the information acquisition unit is configured to include an imaging apparatus arranged close to the light axis of the lamp unit.

3. The headlamp aiming system according to claim 1, wherein the information acquisition unit acquires the information indicating the deviation by driving a lamp unit to be adjusted, of the lamp units mounted in the vehicle horizontal direction.

4. The headlamp aiming system according to claim 1, wherein the light axis displacement unit is provided with:
a pivot shaft configured to pivotally support the lamp unit such that the light axis of the lamp unit is displaced in the vehicle horizontal direction; and
a shaft tilting mechanism configured to tilt the pivot shaft in the vehicle longitudinal direction such that the light axis of the lamp unit is displaced in the vehicle vertical direction.

5. A headlamp aiming system comprising:
a lamp unit configured to emit light in front of a vehicle;
a light axis displacement unit configured to displace the light axis of the lamp unit in at least one of the vehicle vertical direction and the vehicle horizontal direction;
an information acquisition unit configured to acquire information indicating a deviation between an attention area in a light distribution pattern emitted on an aiming screen by the lamp unit and a reference area in front of the vehicle that is to be matched to the attention area; and
a displacement control unit configured to displace the light axis of the lamp unit by driving the light axis displacement unit such that the attention area is matched to the reference area using the deviation acquired by the information acquisition unit,
wherein the attention area is an area with the maximum luminance in the luminance distribution of an image obtained by imaging a light distribution pattern for high beam which contain no cut-off line, and the reference area is a matching area that is projected in front of the vehicle and is to be matched to the area with the maximum luminance.

6. The headlamp aiming system according to claim 5, wherein the light axis displacement unit is provided with:
a pivot shaft configured to pivotally support the lamp unit such that the light axis of the lamp unit is displaced in the vehicle horizontal direction; and
a shaft tilting mechanism configured to tilt the pivot shaft in the vehicle longitudinal direction such that the light axis of the lamp unit is displaced in the vehicle vertical direction.

7. The headlamp aiming system according to claim 5, wherein the information acquisition unit is configured to include an imaging apparatus arranged close to the light axis of the lamp unit.

8. The headlamp aiming system according to claim 5, wherein the information acquisition unit acquires the information indicating the deviation by driving a lamp unit to be adjusted, of the lamp units mounted in the vehicle horizontal direction.

* * * * *